United States Patent [19]
Vraney et al.

[11] Patent Number: 5,487,169
[45] Date of Patent: Jan. 23, 1996

[54] METHOD FOR TRANSLATING A TEST PLAN SOURCE FILE CONTAINING MULTIPLE PROGRAMMING LANGUAGES

[75] Inventors: Lawrence E. Vraney, Cary; Michael S. Protofanousis, Glenview, both of Ill.; Dean R. Loew, Racine, Wis.; Robert W. van Daal, Glenview, Ill.

[73] Assignee: Motorola, Inc., Schaumburg, Ill.

[21] Appl. No.: 154,245

[22] Filed: Nov. 18, 1993

[51] Int. Cl.$^6$ ........................................... G06F 9/44
[52] U.S. Cl. ............................. 395/700; 364/DIG. 1; 364/280.4
[58] Field of Search ................ 395/700; 364/DIG. 1, 364/280.4

[56] References Cited

U.S. PATENT DOCUMENTS 5,230,049  7/1993  Chang et al. ........................ 395/700

Primary Examiner—Thomas M. Heckler
Attorney, Agent, or Firm—Anthony G. Sitko

[57] ABSTRACT

A method and apparatus for translating a text file to an executable procedure is provided. The executable procedure is created by inputting the text file to a translator, determining which translation rule to apply to the text file based upon the context within the text file, and applying the translation rule to the text file.

8 Claims, 4 Drawing Sheets

EXAMPLE TEST PROCEDURE

```
                    ┌─205
         LIBRARY:   START
                    FOR ($I = 0; $I < 10; $I++)
     SEND TO BSC:   {{LOGIN PASSWORD}}
201  EXPECT FROM BSC: LOGIN OK
                    FIND 10:0 "LOGIN OK"
         COMMENT:   THE VALUE OF I = $I.
              203   CONTINUING...
```

```
USER CREATES    EXPECT FROM BSC: LOGIN OK

RULE     "EXPECT FROM BSC" = "MATCH (BSC, 30, "%TEXT");"

TRANSLATION     MATCH (BSC, 30, "LOGIN OK");
```

*FIG. 2*

METHOD FOR TRANSLATING A TEST PLAN SOURCE FILE CONTAINING MULTIPLE PROGRAMMING LANGUAGES

FIELD OF THE INVENTION

This invention relates to the field of translating alphanumeric data, such as found in a text file, based upon the context in which that data appears. The context is determined by a translation rule associated with the alphanumeric data.

BACKGROUND OF THE INVENTION

Testing of two communication processors generally requires the availability of device to monitor the flow of information between the processors. In many cases, during the development of a system of two communication processors, one processor will be completed before the other processor is. In order to assure proper behavior of the completed processor, test equipment is used to transmit test signals to the completed processor. In addition, test equipment also monitors signals generated by the completed processor. The monitored signals are compared to expected output from the completed processor. If unexpected output appears, the completed processor generally must be modified.

Communication systems, are combinations of several interconnected communication processors. Many processors are duplicates of each other, in that one communication processor performs the same function in the system as another. However, there are also many classes of processors. Each separate class of processor is intended to behave differently from other classes of processors. In many cases, each class of processor communicates according to one or more signaling protocols. Also, each class of processors must be tested and debugged. In addition, during the course of communication system development, a subsystem of processors must be tested. A subsystem is an interconnected set of processors of differing classes. These processors may be operatively connected through a wireline, radio link, fiber optic or any other electromagnetic coupling. A subsystem is different than a system in that a subsystem consists of a partial set of the processors required for a fully functional communication system.

The validation of a communication system can become very complicated because of the variety of processors and signaling protocols used to communicate amongst them. For example, consider a system composed of four processors of differing classes: A-B-C-D, where each processor is represented by the letters A,B, C and D, and interconnects are represented by '-'. The available subsystem configurations are:

| A | A-B   | B-C   | C-D |
|---|-------|-------|-----|
| B | A-B-C | B-C-D |     |
| C |       |       |     |
| D |       |       |     |

The task of testing is further complicated when multiple processors of the same class are built into a subsystem under test. A piece of test equipment must be able to communicate to each processor in the signaling protocol of the processor. The test equipment accomplishes the communication by transmitting a test signal to a processor in such a way that the test signal is recognizable as a valid signal of the signaling protocol used by the processor. In addition, the test equipment must be able to address the processor under test, in that the test equipment and subsystem under test must have an interconnection and that each device has the network address of the other device.

Each subsystem is responsive to one or more sets of test signals transmitted to and received from a plurality of network addresses. A test procedure consists of transmitting one or more test signals to the network addresses of the subsystem and receiving one or more response signals from the network addresses. A test signal is a digital packet made up of alternating high and low voltages, frequency shifts or whatever may be interpreted as a binary '1' or '0'. Usually a sequence of binary '1's and '0's, also known as bits, contains sequences which identify, among other things: the beginning of a packet; the end of a packet; the address to which the packet should be routed; parity, checksum and other error detecting sequences; a command and information required by a calling processor.

The nature and relative sizes of each sequence vary according to the application of the communication processor, thus a variety of protocols have been developed to serve the needs of each application—and new protocols are developed regularly for special purposes.

Conventional testing is accomplished by a single piece of test equipment, known as an interface device, which tests a developed processor by transmitting and receiving packets using the protocol to which the developed processor is responsive. The transmitting and receiving occurs under the programmed control of the interface device. The programmed control consists of a series of commands that build packets in the protocol being used, typically each sequence of bits must be specified by a separate command, which results in many lines of programming to define a packet and transmit a packet.

In many cases though, the developed processor is transmitting at multiple interfaces, often with multiple protocols. Therefore, a need exists for a way to gather commands into a single file which creates sections where code is translated by rules tailored to transmit and receive data content without having to explicitly specify the data format.

BRIEF DESCRIPTION OF THE DRAWINGS

FIG. 2 is a diagram showing a preferred embodiment example of a test procedure in accordance with the present invention;

DETAILED DESCRIPTION

Figure 1:
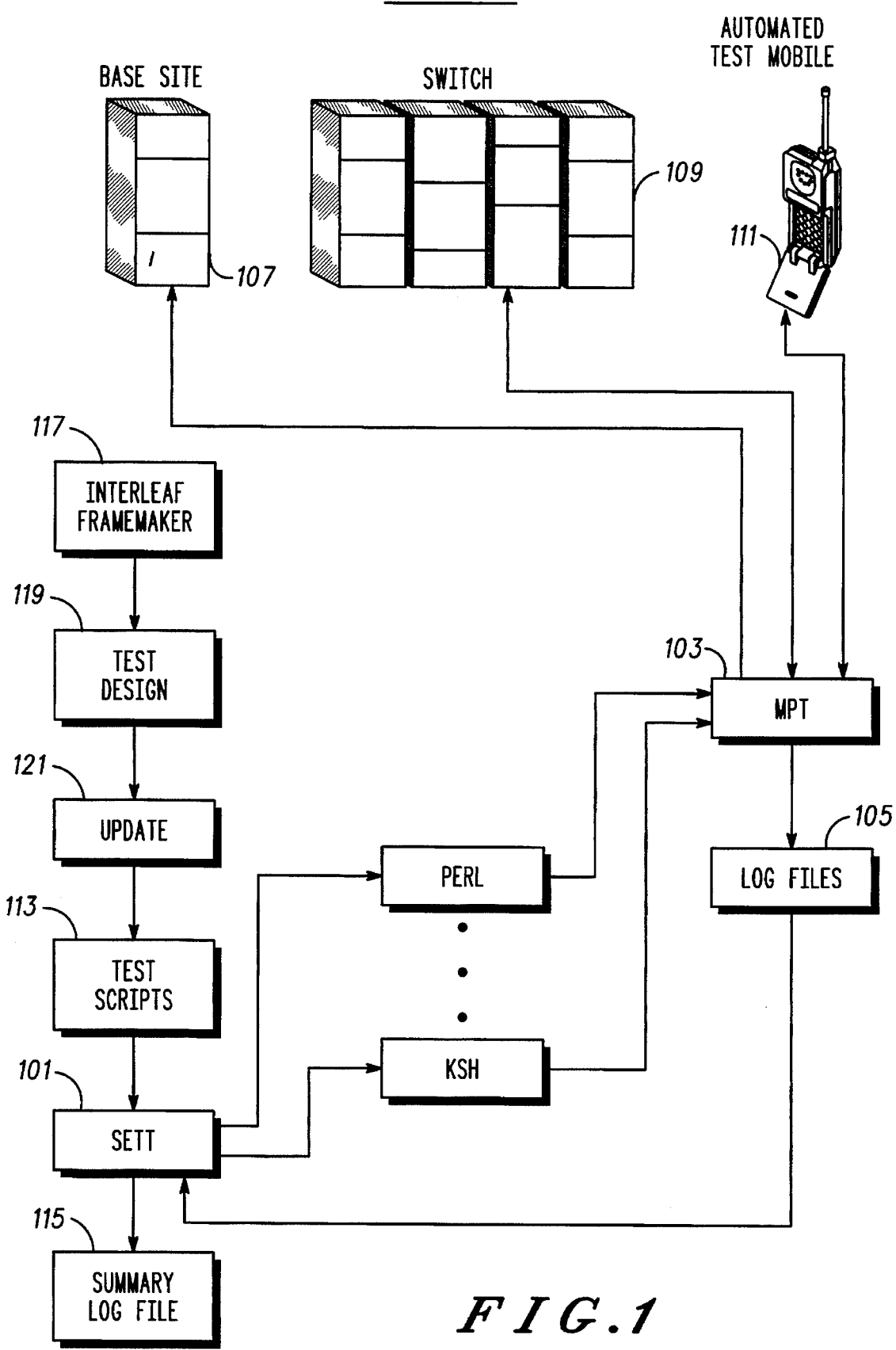
FIG. 1 is a combined block diagram of the process of generating and executing a procedure.

A test plan preferably is stored as a text file which is organized to contain multiple test designs. FIG. 1 shows the test design as 119, which is typically produced using a word processor such as Interleaf or FrameMaker 117. Each test plan contains executable source code. The purpose of a test plan is to test a particular function in the system under test. A test design is constructed in a hierarchical manner, that is, the test design has a number of elements in its contents. The largest block of the hierarchy is the design. The design is broken down into multiple cases. A case is further broken down into multiple descriptive strings and a procedure. A procedure is broken down into multiple components. A component is a section of text which is translated according to a set of rules that is applicable to the component. A component consists of a component identifier followed by a list of instructions.

When selecting desired test designs to execute, it is often desirable not to include a subset of all test cases during a particular test run. Once a test plan is selected, the Script Execution Test Tool, otherwise known as SETT 101, displays to the video display terminal, a list of test designs. If desired, the cases associated with each design of the selected test plan may be displayed to the video display terminal in the form of a list. Desired test cases may be selected from the list by using a suitable pointer device, such as a mouse or keyboard. Once the desired test cases are selected, the test cases may be executed by a keyboard command or a mouse actuated point-and-click display button. Each test case is executed in the order in which it is displayed to the video display terminal. If anomalous activity occurs during test case execution, it is desirable to prevent further execution. This is provided by a kill test point-and-click display button which commands SETT to inhibit further test case execution.

FIG. 1 shows the process of creating the executable procedure and an example of a hardware configuration under test. The test design 119 is input to be translated by the translator shown in the box marked Update 121. The translator generates one or more test scripts 113. SETT 101 issues commands to an executing program named MPT 103, which is the acronym for Message Processing Tool. MPT is a test driver which routes commands to the interface devices identified in the executable procedure. MPT also records an English language description of the commands that are routed, and any responses to the commands by storing the description in log files 105. The commands are routed to the device under test. The device under test is the subsystem comprised of the radio-telephone base site 107 and the public switched telephone network switch 109. The interface device is the automated test mobile 111, which interconnects to the base site through radio frequency transmits and receives. SETT also accepts the log files as input. SETT processes the log files in order to produce a line of text for each test design run. The resultant file is stored as a summary log file 115.

SETT interprets the log files and displays the results to the video display terminal on a line by line basis. Each line identifies a test case by name and includes information such as the duration of the test, the number of test signals sent by the test apparatus, the number of signals sent to the test apparatus by the system under test, the number of WARNING messages generated by the test apparatus, the number of signals sent by the system under test that met a predefined criteria, and the overall outcome of the test. The overall outcome of the test can be either "passed", "failed", "aborted", "executed", "incomplete", or "error".

The "passed" outcome of the test case indicates certain information about signals received from the system under test. When all such received signals that are matched against a predefined criteria fully satisfy the predefined criteria, the outcome of the test is "passed". The "failed" outcome of the test case indicates that no signal was received from the system under test that matched a predefined criteria within a predefined period of time.

The "aborted" outcome of the test case indicates that a command was issued through a user interface device to stop execution of the test procedure.

The "executed" outcome of the test case indicates that a test completed which made no comparisons of received signals with any criteria.

The "incomplete" outcome of the test case indicates that no information is available concerning the test since the test log file was either unreadable or nonexistent.

The "error" outcome of the test case indicates that a test driver error occurred. A test driver error includes such things as a bad communication link, or a serial port busy error.

Referring now to FIG. 2, there is shown an example test procedure. The italicized word 'library:' 205 marks a component which is one line long. The italicized word 'comment:' 203 marks a component which is two lines long.

Figure 3:
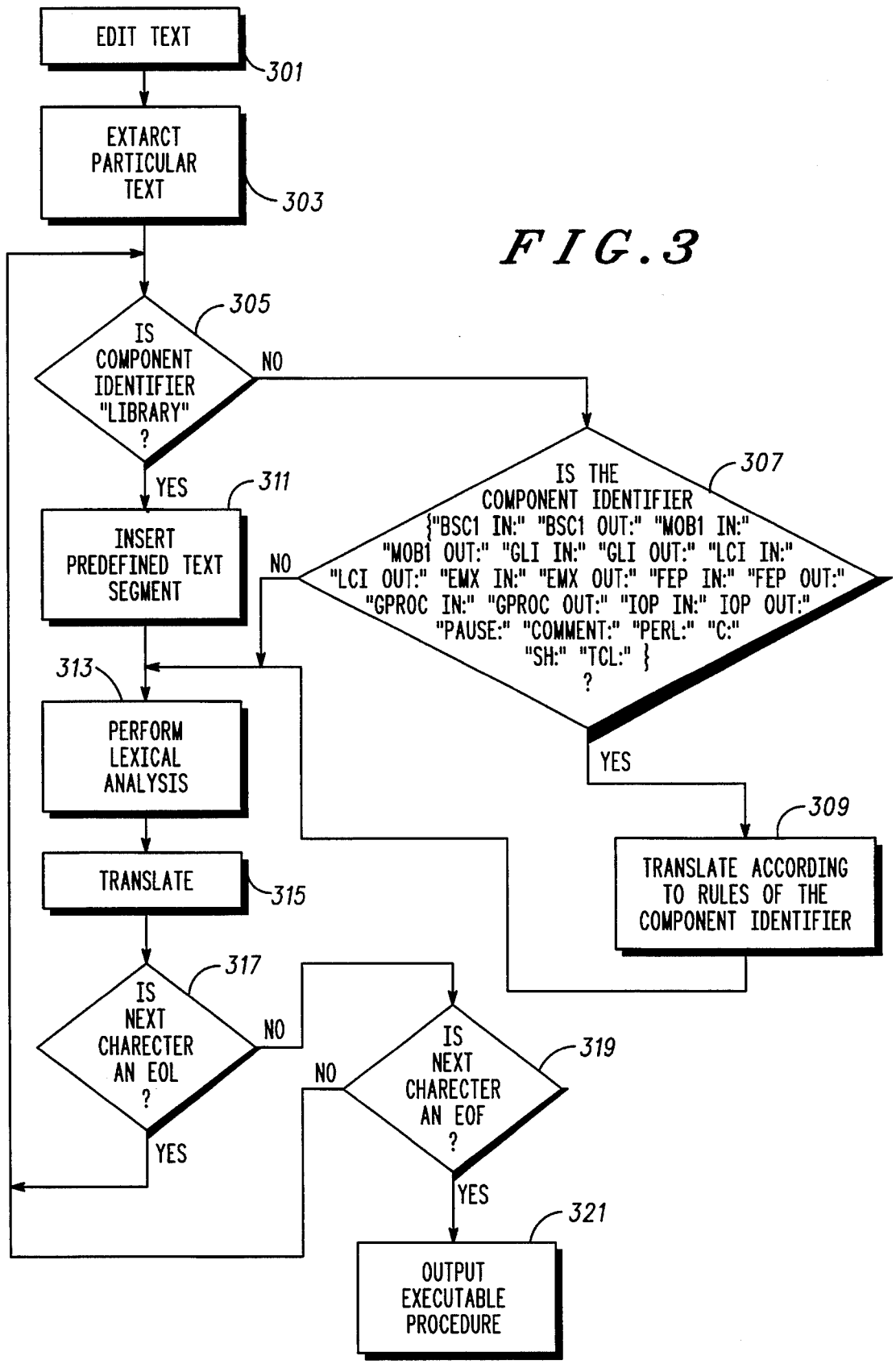
FIG. 3 is a flowchart of a preferred embodiment identifying the steps of creating an executable procedure.

Referring now to FIG. 3, there is shown the method for translating a text file. The text is inputted using a word processor 301. It will be appreciated by one skilled in the art that any word processor may be used, such as vi, emacs, FrameMaker or Interleaf, which are available for UNIX based computer systems. A processor executing a program filters the text by discarding all information relating to formatting, such as page-breaks, margin widths, font specifications. The resulting filtered text is that particular separated and extracted text 303. The processor subsequently searches for component identifiers. The search begins at the beginning of the particular text file. Component identifiers are strings of characters that are the first non-white space characters in a line which match a predefined set of strings. A component identifier is a text entry in a test plan file which specifies a set of translation rules to be applied to all following strings up until another component identifier. If the component identifier matches the string, "library:", each subsequent string that appears in a line not containing another component identifier, is treated as a reference to a second text file 305. The contents of the second file are inserted in place of the line 311. The contents of the second file are translated from first character to last character as if the second file had been a part of the first file. The next line referring to a file is processed in similar fashion. This continues until there are no further lines referring to separate files. The remainder of the first file is then translated.

If a component identifier matches the string, "bsc1 in:" 307, for example, each subsequent string that appears in a line not containing a second component identifier, is translated 309 according to the rules associated with the "bsc1 in:" component identifier.

The remaining characters in each line are processed according to the rules selected with the component identifier. First, the processor performs lexical analysis 313 in order to group the characters into keywords. Lexical analysis consists of storing strings of characters that are terminated by spaces, tabs and carriage returns in the original text file. Lexical analysis continues until the end of line (EOL) is reached 317. The spaces, and tabs are discarded. The result is a sequence of keywords that are stored in a convenient manner for further processing. Second, the processor translates 315 those keywords according to the syntax of the selected rules. In the case that the component identifier is "perl", the contents of the component preferably are translated according to the rules of the perl programming language. For example, these rules are described in *Programming perl*, by Larry Wall and Randal Schwartz, 1991, O'Reilly & Associates. In the event that the component identifier is "c", the contents of the component are translated according to the rules of the C programming language. For example, these rules are described in *The C Programming Language*, by Brian Kernighan and Dennis Ritchie, Copyright 1978 by Prentice-Hall, Inc. The programming languages of "sh", and "tcl" each have their own defined set of rules. It will be appreciated that printed languages used by people of varying nationalities have defined sets of rules that are applied to translations from one language to another.

The translation of the text file continues in this manner until the end of file (EOF) 319 is reached. When the end of file is reached, the translated text is output to a separate file as executable source code 321.

Figure 4:
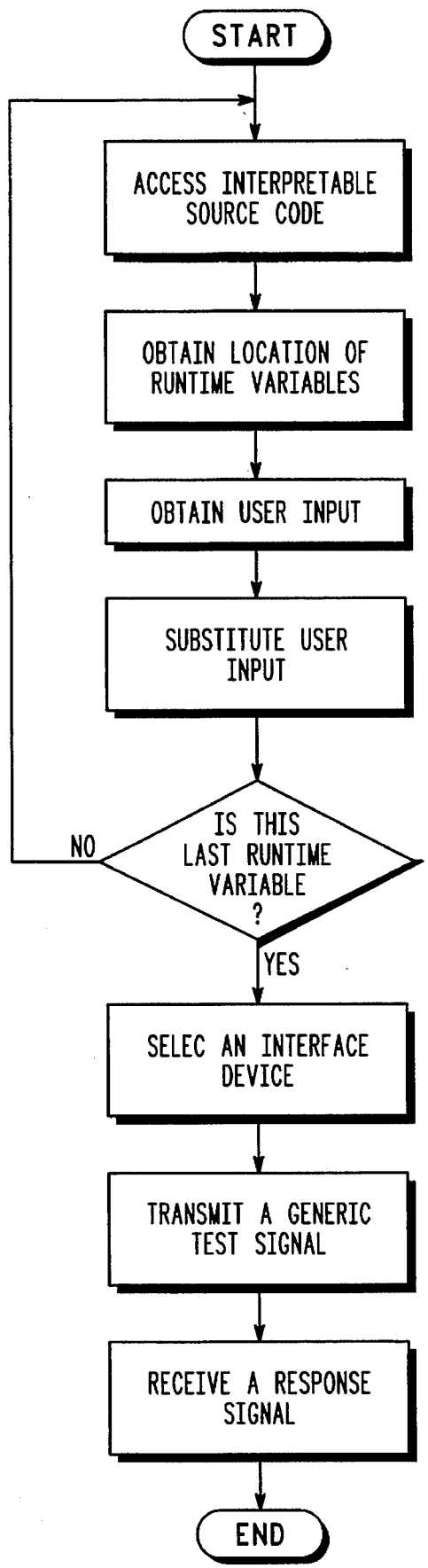
FIG. 4 is a flowchart of a preferred embodiment identifying the steps of executing a test design.

Now turning attention to FIG. 4, a program executes the interpretable source code by accessing the interpretable source code 401. The program is called the Script Execution Test Tool, which is abbreviated as SETT. The program may also read compilable source code. Generically, both interpretable source code and compilable source code are named source code.

SETT examines the source code and obtains the location 403 of run-time variables. Run-time variables are identifiable from other source code in that the run-time variables are strings enclosed in double curly braces, e.g. {{mgli_address}}. The names of the run-time variables are displayed to a monitor so that a human operator may enter values for them. SETT provides data entry fields for the human operator to enter text corresponding to each run-time variable. By prompting the human operator with the display of run-time variables, SETT obtains keystrokes from the human operator thus obtaining user input 405. Each set of keystrokes followed by a carriage return make up a run-time variable entry. The run-time variable entry may be an alphanumeric string, or a value consisting of digits, a decimal point and a plus or minus sign. The run-time variables are useful to define current configurations of equipment in a lab. Some items which change frequently would be the subject of a run-time variable, for example, a login password, a checksum, a time-out value and a device address.

When the human operator has completed input, SETT substitutes the entered values for the run-time variables, including the double curly braces 407. Each substitution begins with deleting the left pair of curly brackets, the right pair of curly brackets and the text between the pairs of brackets. At the location in the file where the curly brackets and the text between them were deleted, SETT inserts the run-time variable entry. Based upon the run-time variable entries and receiving a command to start from the user, SETT selects an interface with which to communicate 409. Generally, SETT will operate on a processor that is attached to an ethernet local area network. A local area network, also known as LAN, is a collection of processors that communicate between each other by a wired connection. SETT can communicate with any processor that communicates using the ethernet LAN. Collectively, the ethernet LAN and the class of processors that communicate using the ethernet LAN but do not communicate to the device under test are called the test apparatus. Any processor on the ethernet LAN having the means for converting test signals from one protocol to another is considered to be an interface device. Such interface devices are responsive to SETT transmitted test signals and convert the test signals to a protocol which is transmitted to a device under test. In any event, SETT transmits a test signal 411 to the interface device and then waits to receive a response signal 413 from the interface device. A device under test may include a subsystem comprised of a plurality of processors. Every device under test is a communication system component. The interface devices also convert protocols received from the device under test to the ethernet LAN protocol. Some of the protocols the interface devices are capable of transmitting and receiving are parallel protocols, such as IEEE-488 GPIB; and serial protocols such as RS-232, and digital radio frequency protocols.

In summary, the translator translates a text file through a series of steps in order to obtain an executable procedure. First, the translator receives a text file as input. Second, the translator determines which set of translation rules to apply by selecting a rule set based upon an entry in the text file. The rule set may, for example, be selected from the "perl" programming rules, "c" programming rules, "sh" programming rules, "tcl" programming rules, grammar checking rules and language conversion rules. Third, from amongst the rule set selected, a language specific rule is applied to a particular portion of text.

Yet another embodiment of the invention, is a method for testing a communication system. Initially, the invention receives an input for a run-time variable entry. Next, the invention selects a communication system component to be tested. Next, the invention selects an interface device to use to communicate with the communication system component. Last, the invention executes a test case using the obtained value for the run-time variable entry.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed.

What is claimed is:

1. A method for translating a test plan source file containing multiple programming languages, each programming language being identified by a component identifier comprising the steps of:

(a) inputting the test plan source file to a translator;

(b) performing lexical analysis on the test plan source file to locate one of a plurality of component identifiers within the test plan source file, each component identifier having associated therewith a portion of text;

(c) translating the portion of text of the test plan source file associated with the one component identifier according to a translation rule associated with the one component identifier and copying the translated portion of text into a translated test plan file;

(d) repeating step (c) for each component identifier of the plurality of component identifiers.

2. The method of claim 1 wherein the step of performing lexical analysis comprises grouping characters in the test plan source file to form the plurality of component identifiers.

3. The method of claim 2 wherein the step of performing lexical analysis further comprises grouping characters in the test plan source file to form keywords.

4. The method of claim 3 wherein the step of translating the portion of text of the test plan source file comprises translating the keywords according to a translation rule associated with the one component identifier.

5. The method of claim 4 wherein the translation rule is selected from the group consisting of "perl" programming language rules, "c" programming language rules, "sh" programming language rules, and "cl" programming language rules.

6. The method of claim 1 wherein the step of translating the portion of text of the test plan source file further comprises inserting from a library file an additional portion of text in the test plan source file and translating the inserted additional portion of text.

7. The method of claim 1 wherein the step of translating the portion of text of the test plan source file further comprises translating the test plan source file into a test plan executable procedure having interpretable code.

8. The method of claim 1 wherein the step of translating the portion of text of the test plan source file further comprises translating the test plan source file into a test plan executable procedure having compilable code.

* * * * *

UNITED STATES PATENT AND TRADEMARK OFFICE
CERTIFICATE OF CORRECTION

PATENT NO. : 5,487,169
DATED : January 23, 1996
INVENTOR(S) : Vraney, et al.

It is certified that error appears in the above-indentified patent and that said Letters Patent is hereby corrected as shown below:

Column 7, line 6 reads "and "cl" programming" should be
---and "tcl" programming---.

Signed and Sealed this

Twenty-fifth Day of June, 1996

Attest:

BRUCE LEHMAN

Attesting Officer                Commissioner of Patents and Trademarks